(12) United States Patent
Fujino et al.

(10) Patent No.: US 6,222,657 B1
(45) Date of Patent: Apr. 24, 2001

(54) INFRARED TRANSCEIVING APPARATUS

(75) Inventors: Shouji Fujino; Hiroaki Yanagisawa; Jiro Nawa; Kazuji Kobayashi, all of Tokyo (JP)

(73) Assignee: Temco Japan Co., Ltd., Tokyo (JP)

( * ) Notice: Subject to any disclaimer, the term of this patent is extended or adjusted under 35 U.S.C. 154(b) by 0 days.

(21) Appl. No.: 09/159,670

(22) Filed: Sep. 24, 1998

(51) Int. Cl.⁷ ............................. H04B 10/00; H04B 10/10
(52) U.S. Cl. ........................ 359/152; 359/154; 359/159
(58) Field of Search ..................... 359/154, 110–195, 359/152

(56) References Cited

U.S. PATENT DOCUMENTS

| | | | |
|---|---|---|---|
| 4,727,600 | * | 2/1988 | Avakian ............................. 455/601 |
| 4,875,756 | * | 10/1989 | Estes ................................. 350/96.2 |
| 5,027,433 | * | 6/1991 | Menadier ........................... 455/606 |
| 5,229,871 | * | 7/1993 | Czarnek ............................. 359/15 |
| 5,347,387 | * | 9/1994 | Rice ................................... 359/152 |
| 5,526,161 | * | 6/1996 | Suzuki ............................... 359/172 |
| 5,757,528 | * | 5/1998 | Bradley ............................. 359/152 |
| 5,861,968 | * | 1/1999 | Kerklaan ........................... 359/152 |
| 5,986,785 | * | 11/1999 | Kobayashi ......................... 359/152 |

* cited by examiner

*Primary Examiner*—Leslie Pascal
*Assistant Examiner*—Agustin Bello
(74) *Attorney, Agent, or Firm*—Browdy and Neimark

(57) ABSTRACT

In the apparatus, in accordance with the presence or absence of a barrier, arrangement of its light-receiving and its light-emitting element is changed to avoid interference with its proper light-receiving operation from the barrier, which makesso the apparatus free from noise problems, malfunctions and like troubles caused by the interference. In construction, a cover 2 permeable to infrared is rotatably mounted on a base 1. A stationary base plate 9 and a movable base plate 10, which is rotatable together with the cover 2, are stacked together inside the cover 2 to realize a two-layer arrangement. Each of these base plates 9, 10 carries a light-receiving element 7, 12 and/or a light-emitting element 8, 13, and assumes a substantially semicircular shape.

18 Claims, 3 Drawing Sheets

(A)

(B)

INFRARED TRANSCEIVING APPARATUS

BACKGROUND OF THE INVENTION

1. Field of the Invention

The present invention relates to an infrared transceiving apparatus, and more particularly an infrared transceiving apparatus, which is utilized in a communication instruments and the like, and provided with a container containing both a light-emitting element and a light-receiving element for covering a wide area.

2. Description of the Related Art

In a conventional infrared transceiving apparatus, in general, as shown in FIGS. 6(A) and 6(B), a cover member 21 made of a material such as acrylic resins and like materials permeable to infrared is provided in a container 20, in which a printed board 24 assuming a circular shape is disposed and carries a light-emitting element 22 in its upper surface and a light-receiving element 23 in its lower surface. In order to cover a wide area and a wide angle, a plurality of these elements 22, 23 are disposed in a peripheral portion of the printed board 24 at equal intervals.

In the conventioanl infrared transceiving apparatus described above, its light-emitting operation is evenly performed over the entire peripheral area of the apparatus, and, therefore there is no problem in the light-emitting operation when a barrier such as a wall 25 does not exist in the vicinity of the apparatus. On the other hand, when the barrier exists in the vicinity of the apparatus, infrared rays issued from the light-emitting element 22 hit the barrier, reflect therefrom and catch in the light-receiving element 23, which interferes a proper light-receiving operation of the apparatus.

SUMMARY OF THE INVENTION

Under such circumstances, the present invention was made. Consequently, it is an object of the present invention to provide an infrared transceiving apparatus, which is free from any disadvantages inherent in the convetional apparatus, capable of changing in arrangement its light-receiving and its light-emitting element in accordance with the presence or absence of a barrier nearest to the apparatus, and, therefore capable of avoiding any troubles caused by catching a reflected component of the infrared rays having been issued from its light-emitting element and reflected from the barrier.

According to a first aspect of the present invention, the above object of the present invention is accomplished by providing:

An infrared transceiving apparatus comprising:
a base member;
a cover member rotatably mounted on the base member, the cover member being made of a material permeable to infrared rays;
a stationary base plate disposed inside the cover member;
a movable base plate disposed inside the cover member, the movable base plate being rotatable together with the cover member;
the stationary base plate and the movable base plate being stacked together inside the cover member to realize a two-layer arrangement of the base plates; and
each of the stationary base plate and the movable base plate carrying a light-receiving element and/or a light-emitting element.

According to a second aspect of the present invention, the above object of the present invention is accomplished by providing:

The infrared transceiving apparatus as set forth in the first aspect of the present invention, wherein:
each of the stationary base plate and the movable base plate assumes a substantially semicircular shape.

According to a third aspect of the present invention, the above object of the present invention is accomplished by providing:

The infrared transceiving apparatus as set forth in the first aspect of the present invention, wherein:
each of the stationary base plate and the movable base plate assumes a circular shape; and
disposed on a half of the circular shape are the light-receiving and the light-emitting element.

According to a fourth aspect of the present invention, the above object of the present invention is accomplished by providing:

The infrared transceiving apparatus as set forth in any one of the first to the third aspects of the present invention, wherein:
the stationary base plate is fixedly mounted on a hollow shaft which extends upward from the base member; and
the movable base plate is pivoted to a rotary shaft which is rotatably mounted in the hollow shaft in an insertion manner.

According to a fifth aspect of the present invention, the above object of the present invention is accomplished by providing:

The infrared transceiving apparatus as set forth in any one of the first to the third aspects of the present invention, wherein:
the stationary base plate is fixedly mounted on a support shaft which extends upward from the base member; and
the movable base plate is fixedly mounted on another support shaft which extends downwardly from the cover member.

According to a sixth aspect of the present invention, the above object of the present invention is accomplished by providing:

The infrared transceiving apparatus as set forth in the fifth aspect of the present invention, wherein:
each of the support shaft for the stationary base plate and the another support shaft for the movable base plate is eccentrically arranged.

According to a seventh aspect of the present invention, the above object of the present invention is accomplished by providing:

The infrared transceiving apparatus as set forth in any one of the first to the sixth aspects of the present invention, wherein:
disposed in each of facing surfaces of the stationary base plate and the movable base plate therebetween is the same type of the elements.

DESCRIPTION OF THE PREFERRED EMBODIMENTS

Hereinbelow, the present invention will be described in detail with reference to the accompanying drawings.

Figure 1:
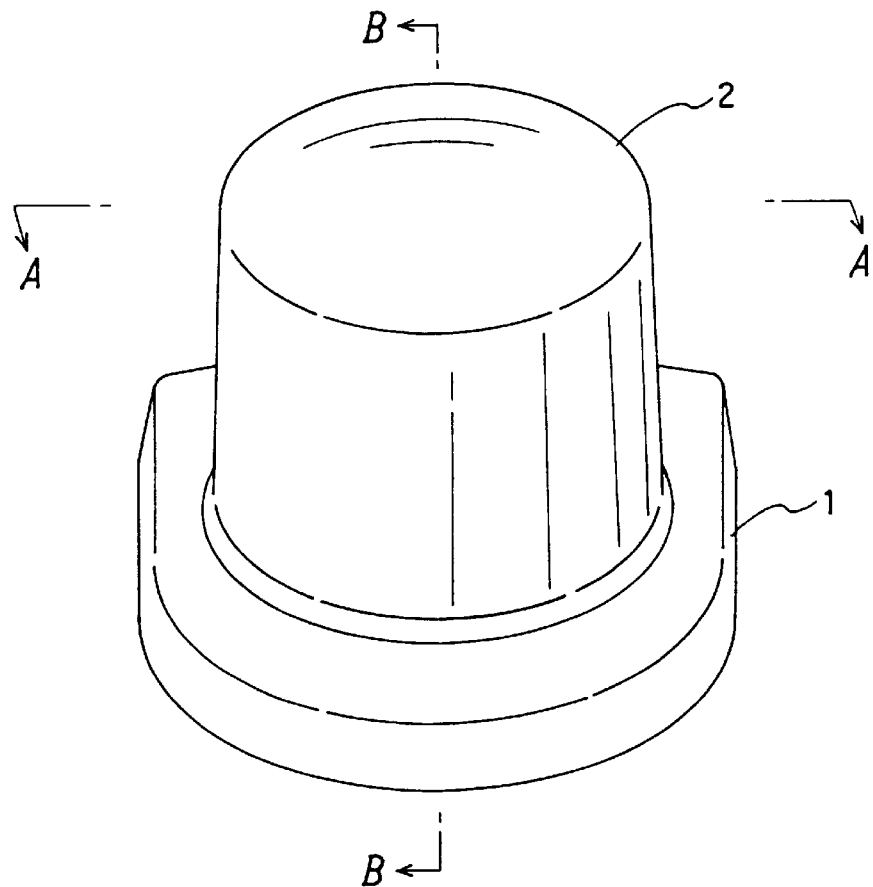
FIG. 1 is a perspective view of the first embodiment of the infrared transceiving apparatus of the present invention.
Figure 2:
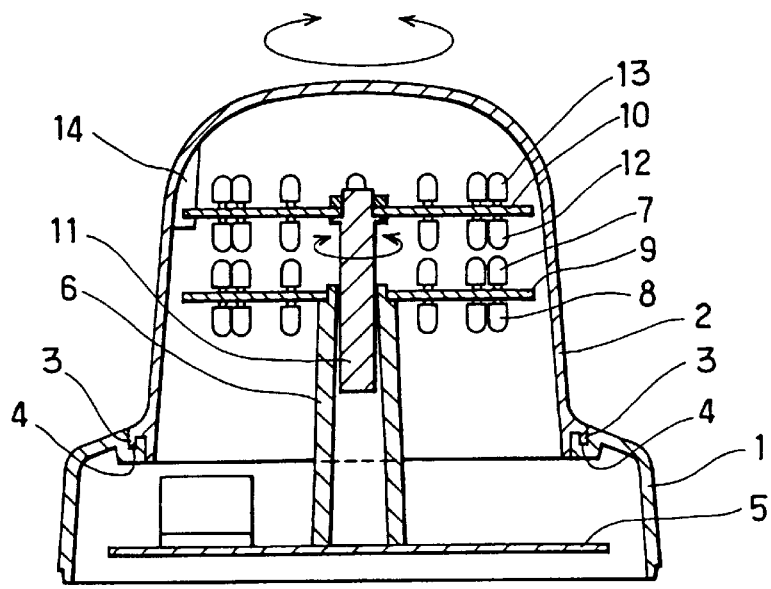
FIG. 2 is a longitudinal sectional view of the the infrared transceiving apparatus of the present invention, taken along the line A—A of FIG. 1.
Figure 3:
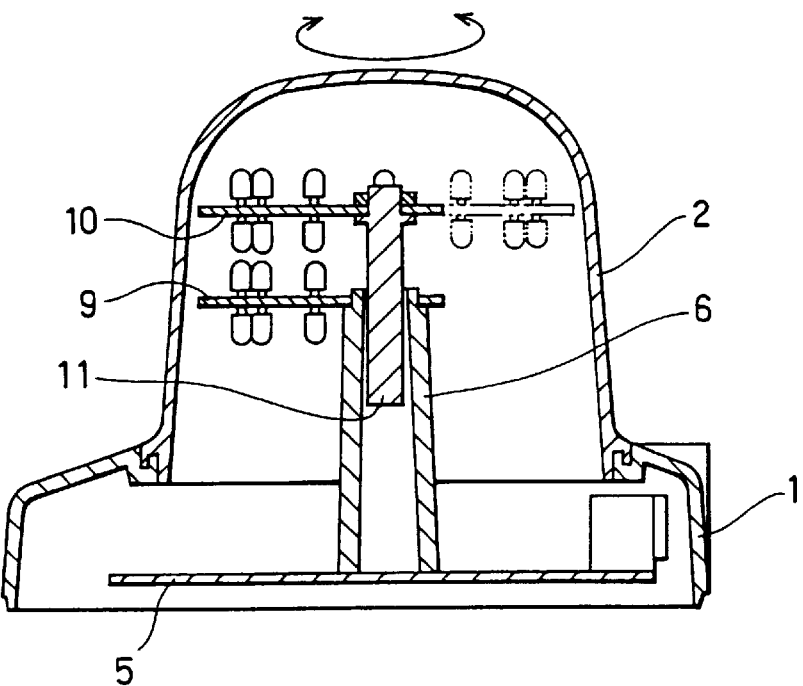
FIG. 3 is a a longitudinal sectional view of the the infrared transceiving apparatus of the present invention, taken along the line B—B of FIG. 1.

FIG. 1 shows a perspective view of a first embodiment of an infrared transceiving apparatus of the present invention. FIG. 2 shows a longitudinal sectional view of the the infrared transceiving apparatus of the present invention, taken along the line A—A of FIG. 1. FIG. 3 shows a longitudinal sectional view of the the infrared transceiving apparatus of the present invention, taken along the line B—B of FIG. 1.

In the drawings: reference numeral 1 denotes a base member; and, 2 a cover member rotatably mounted on the base member 1. The cover member 2 is made of a material such as acrylic resins and like materials permeable to infrared rays, and is provided with an insertion edge portion 3, for example, in its peripheral area. This insertion edge portion 3 of the cover member 2 is inserted into an annular groove 4 of an upper surface of the base member 1, so that the cover member 2 is rotatably mounted on the base member 1.

Disposed inside the base member 1 is a main base plate 5 on which a connector and like components are disposed. A hollow shaft 6 is vertically installed in a central area of the interior of the base member 1. Fixedly mounted on an upper-end portion of the hollow shaft 6 is a substantially semicircular base plate 9 in which, for example: a plurality of light-receiving elements 7 are disposed on a peripheral area of an upper surface of the base plate 9; and, a plurality of light-emitting elements 8 are disposed on a peripheral area of a lower surface of the base plate 9.

Movably inserted in the hollow shaft 6 is a rotary shaft 11. Mounted on an upper portion of the rotary shaft 11 is a substantially semicircular base plate 10. In a peripheral area of a lower surface of the base plate 10, there are disposed a plurality of the same elements as those 7 disposed on the upper surface of the base plate 9 (i.e., which elements are the light-receiving elements 12 in the first embodiment of the present invention shown in the drawings). On the other hand, in a peripheral area of an upper surface of the base plate 10, there are disposed a plurality of elements different in type from the above elements 12 (i.e., which elements are the light-emitting elements 13 in the first embodiment shown in the drawings). As described above, in construction, the base plates 9, 10 are arranged in a manner such that they face each other to have their facing surfaces carry the same type elements. The reason why the base plates 9, 10 are arranged in the above maner is that it is necessary to eliminate any noise problem caused by the infrared rays. In general, spontaneously-emitted infrared rays may reflect when hitting even a tiny pit portion (for example such as burrs), and catch in the light-receiving elements nearest to the apparatus to cause the noise problem.

The movable base plate 10 is fixed to at least one fixing portion 14 of the cover member 2, in which the fixing portion 14 projects inwardly from an inner wall of the cover member 2. Consequently, when the cover member 2 is rotated, the base plate 10 is also rotatably driven together with the cover member 2. Rotation of the base plate 10 is supported by the rotary shaft 11 which is rotatably mounted in the hollow or support shaft 6 in an insertion manner.

Figure 4:
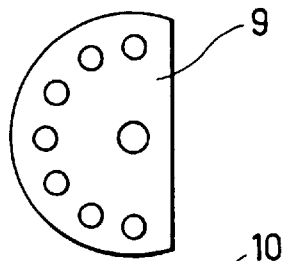
FIGS. 4(A) and 4(B) are plan views each showing the stationary and the movable base plate used in the infrared transceiving apparatus of the present invention of FIG. 1, illustrating relative motion of these base plates.
Figure 4:
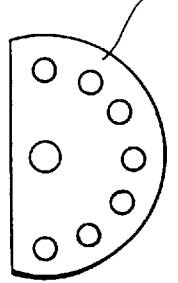
Figure 4:
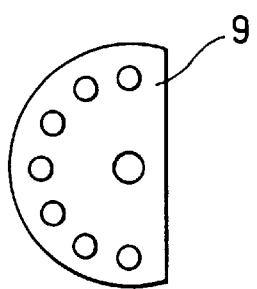
Figure 4:
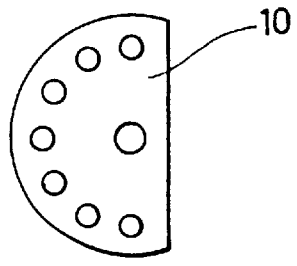

When there is no barrier in the vicinity of an installation area of the infrared transceiving apparatus of the present invention having the above construction, it is possible for the apparatus of the present invention to emit the infrared rays in all directions from its entire peripheral portion. Consequently, in this case, the cover member 2 is rotated in a manner such that the movable base plate 10 is oriented in a direction opposite to that of the stationary base plate 9 to assume a position shown in phantom lines in FIG. 3, or shown in plan view in FIG. 4(A). On the other hand, when the barrier is found in the vicinity of the installation area of the apparatus of the present invention, the apparatus of the present invention is set in a manner such that: both the stationary base plate 9 and the movable base plate 10 are oriented in a direction opposite to the barrier; and, then the cover member 2 is rotated to have the movable base plate 10 orient in a direction free from the barrier. In case that the barrier is constructed of a wall, in general the movable base plate 10 is oriented in the same direction as that of the stationary base plate 9, as shown in solid lines in FIG. 3, or shown in plan view of FIG. 4(B).

Figure 5:
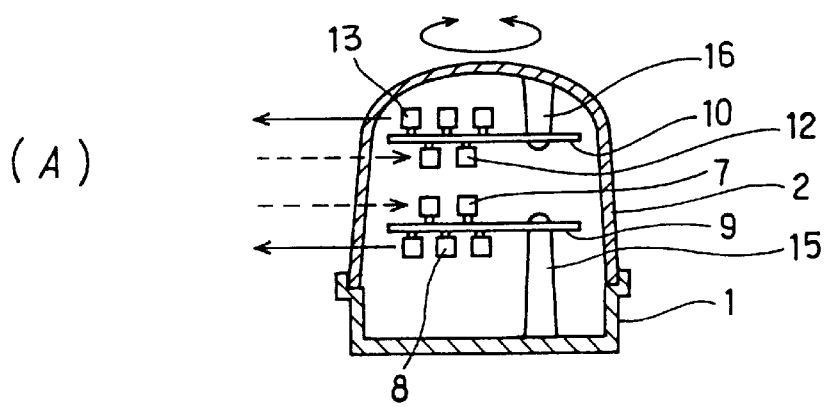
FIGS. 5(A) and 5(B) are longitudinal sectional views each showing another embodiment of the infrared transceiving apparatus of the present invention.
Figure 5:
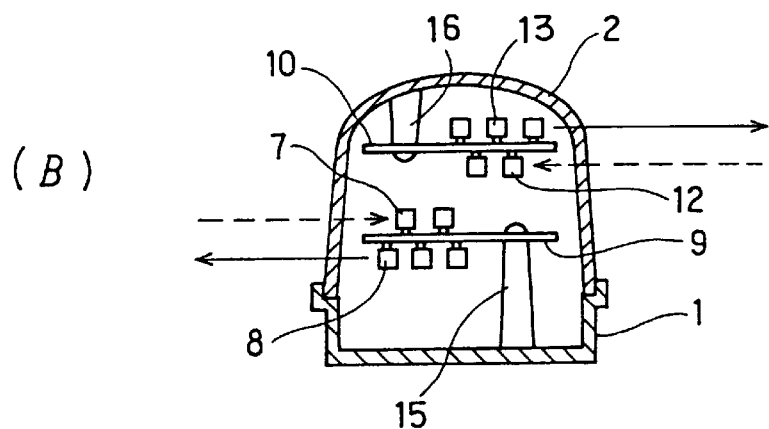
Figure 6:
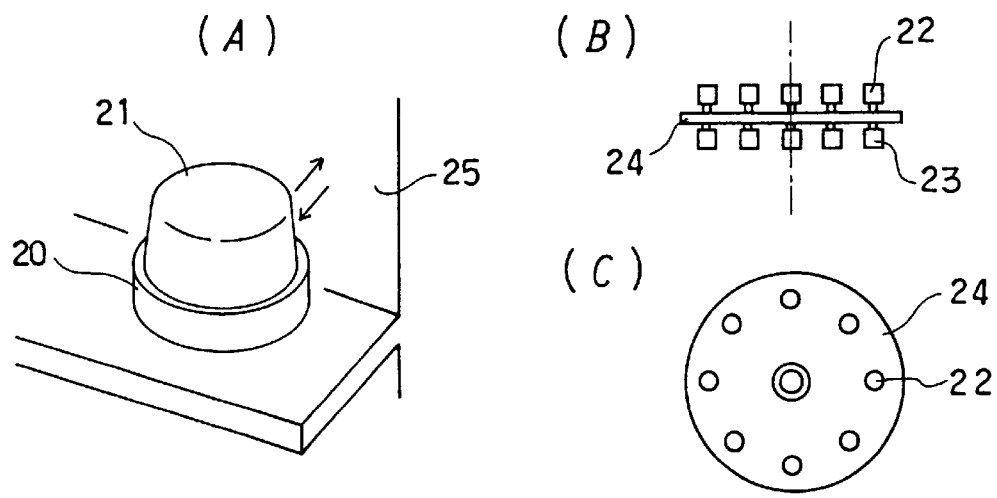
FIG. 6(A) is a perspective view of the conventional infrared transceiving apparatus.
FIG. 6(B) is a side view of the circular printed board of the conventional infrared transceiving apparatus shown in FIG. 6(A)
FIG. 6(C) is a plan view of the circular printed board of the conventional infrared transceiving apparatus shown in FIG. 6(A).

FIG. 5 shows a second embodiment of the infrared transceiving apparatus of the present invention, in which a method for supporting each of the stationary base plate 9 and the movable base plate 10 is modified. In this second embodiment of the present invention, the stationary base plate 9 is fixedly mounted on a support shaft 15, which extends upwardly from the base member 1. On the other hand, the movable base plate 10 is fixedly mounted on a support shaft 16, which extends downwardly from the cover member 2. As a result, as shown in the drawings, it is possible for the second embodiment of the present invention to save in space necessary for rotation of the movable base plate 10 and downsize the apparatus of the present invention when the support shafts 15 and 16 are so provided as to be eccentric to the base member 1 and the cover member 2, respectively.

In this second embodiment of the present invention, in case that the barrier is found in the vicinity of the apparatus of the present invention, both the stationary base plate 9 and the movable base plate 10 are oriented in the same direction, as shown in FIG. 5(A). On the other hand, in case that no barrier is found in the vicinity of the apparatus of the present invention, the base plates 9, 10 are oriented in opposite directions, as shown in FIG. 5(B). Incidentally, in FIGS. 5(A) and 5(B), each of the arrows in solid lines shows a path of the emitted light, while each of the arrows in dotted lines shows a path of the received light.

In any of the above embodiments of the infrared transceiving apparatus of the present invention, each of the stationary base plate 9 and the movable base plate 10 carries both types of the light-receiving elements 7, 12 and the light-emitting elements 8, 13. However, it is also possible for each of the stationary base plate 9 and the movable base plate 10 to carry only one of the above types (i.e., the light-receiving elements 7, 12 only, or the light-emitting elements 8, 13 only) in a manner such that: when one of the the stationary base plate 9 and the movable base plate 10 carries the light-emitting elements 8, 13 only, the other carries the light-receiving elements 7, 12 only, provided that the light-emitting elements 8, 13 are disposed so as not to face the light-receiving elements 7, 12.

Further, it is also possible to accomplish the object of the present invention by: forming each of the stationary base plate 9 and the movable base plate 10 into a circular shape; and, disposing each type of the elements on a half of each of such circular-shaped base plates.

As described above, the infrared transceiving apparatus of the present invention is simple in construction, and capable of changing in orientation and arrangement the light-emitting and the light-receiving elements in accordance with the presence or absence of the barrier which interferes with the proper light-receiving operation of the apparatus. Consequently, it is possible for the infrared transceiving apparatus of the present invention to avoid such interference with its proper light-receiving operation from the barrier without fail, which enables the apparatus of the present invention to be free from any noise problem, malfunction and like troubles.

What is claimed is:

1. An infrared transceiving apparatus comprising:
   a base member;
   a cover member rotatably mounted on said base member, said cover member being made of a material permeable to infrared rays;
   a stationary base plate disposed inside said cover member;
   a movable base plate disposed inside said cover member, said movable base plate being rotatable together with said cover member;
   said stationary base plate and said movable base plate being stacked together inside said cover member to realize a two-layer arrangement of said base plates; and
   each of said stationary base plate and said movable base plate carrying a light-receiving element and/or a light-emitting element.

2. The infrared transceiving apparatus as set forth in claim 1, wherein:
   each of said stationary base plate and said movable base plate assumes a substantially semicircular shape.

3. The infrared transceiving apparatus as set forth in claim 2, wherein:
   said stationary base plate is fixedly mounted on a hollow shaft which extends upward from said base member; and
   said movable base plate is pivoted to a rotary shaft which is rotatably mounted in said hollow shaft in an insertion manner.

4. The infrared transceiving apparatus as set forth in claim 3, wherein:
   disposed in each of facing surfaces of said stationary base plate and said movable base plate therebetween is the same type of said elements.

5. The infrared transceiving apparatus as set forth in claim 2, wherein:
   said stationary base plate is fixedly mounted on a support shaft which extends upward from said base member; and
   said movable base plate is fixedly mounted on another support shaft which extends downwardly from said cover member.

6. The infrared transceiving apparatus as set forth in claim 5, wherein:
   each of said support shaft for said stationary base plate and said another support shaft for said movable base plate is eccentrically arranged.

7. The infrared transceiving apparatus as set forth in claim 6, wherein:
   disposed in each of facing surfaces of said stationary base plate and said movable base plate therebetween is the same type of said elements.

8. The infrared transceiving apparatus as set forth in claim 1, wherein:
   each of said stationary base plate and said movable base plate assumes a circular shape; and
   disposed on a half of said circular shape are said light-receiving and said light-emitting element.

9. The infrared transceiving apparatus as set forth in claim 8, wherein:
   said stationary base plate is fixedly mounted on a hollow shaft which extends upward from said base member; and
   said movable base plate is pivoted to a rotary shaft which is rotatably mounted in said hollow shaft in an insertion manner.

10. The infrared transceiving apparatus as set forth in claim 9, wherein:
    disposed in each of facing surfaces of said stationary base plate and said movable base plate therebetween is the same type of said elements.

11. The infrared transceiving apparatus as set forth in claim 8, wherein:
    said stationary base plate is fixedly mounted on a support shaft which extends upward from said base member; and
    said movable base plate is fixedly mounted on another support shaft which extends downwardly from said cover member.

12. The infrared transceiving apparatus as set forth in claim 11, wherein:
    each of said support shaft for said stationary base plate and said another support shaft for said movable base plate is eccentrically arranged.

13. The infrared transceiving apparatus as set forth in claim 12, wherein:
    disposed in each of facing surfaces of said stationary base plate and said movable base plate therebetween is the same type of said elements.

14. The infrared transceiving apparatus as set forth in claim 1, wherein:
    said stationary base plate is fixedly mounted on a hollow shaft which extends upward from said base member; and
    said movable base plate is pivoted to a rotary shaft which is rotatably mounted in said hollow shaft in an insertion manner.

15. The infrared transceiving apparatus as set forth in claim 14, wherein:
    disposed in each of facing surfaces of said stationary base plate and said movable base plate therebetween is the same type of said elements.

16. The infrared transceiving apparatus as set forth in claim 1, wherein:
    said stationary base plate is fixedly mounted on a support shaft which extends upward from said base member; and said movable base plate is fixedly mounted on another support shaft which extends downwardly from said cover member.

17. The infrared transceiving apparatus as set forth in claim 16, wherein:

each of said support shaft for said stationary base plate and said another support shaft for said movable base plate is eccentrically arranged.

18. The infrared transceiving apparatus as set forth in of claim 1, wherein:

disposed in each of facing surfaces of said stationary base plate and said movable base plate therebetween is the same type of said elements.

\* \* \* \* \*